United States Patent [19]

Hofrichter

[11] Patent Number: 4,854,528
[45] Date of Patent: Aug. 8, 1989

[54] COVER FOR FLAP GUIDE RAILS IN AIRCRAFT WINGS

[75] Inventor: Hanns-Gerhard Hofrichter, Bremen, Fed. Rep. of Germany

[73] Assignee: Messerschmitt-Boelkow-Blohm GmbH, Bremen, Fed. Rep. of Germany

[21] Appl. No.: 127,943

[22] Filed: Dec. 2, 1987

[30] Foreign Application Priority Data

Dec. 3, 1986 [DE] Fed. Rep. of Germany ....... 3641247

[51] Int. Cl.⁴ .......................... B64C 3/50; B64C 21/02
[52] U.S. Cl. ..................................... 244/215; 244/216; 244/130
[58] Field of Search ............... 244/211, 212, 213, 214, 244/215, 216, 217, 218, 219, 130

[56] References Cited

U.S. PATENT DOCUMENTS

| | | | |
|---|---|---|---|
| 3,180,591 | 4/1965 | Ikeda et al. | 244/216 |
| 4,444,368 | 4/1984 | Andrews | 244/216 |
| 4,471,927 | 9/1984 | Rudolph et al. | 244/216 |
| 4,702,442 | 10/1987 | Weiland et al. | 244/216 |

*Primary Examiner*—Sherman D. Basinger
*Assistant Examiner*—Stephen P. Avila
*Attorney, Agent, or Firm*—Ralf H. Siegemund

[57] ABSTRACT

In an aircraft wing having a landing flap, a driven, flap mounting carriage being guided in rails, a tri-parted, aerodynamically contoured cover structure for the rails constructed for avoiding any formation of gaps unfavorable for aerodynamic flow over and around the wing, and having an upstream cover body, a middle cover body and a downstream cover body, the upstream body is secured to the wing; the middle body is hinged to the upstream body; the downstream body is hinged to the carriage by means of a first hinge connected to the downstream body, a biparted rocker connected to the first hinge, a second hinge connects the rocker to the carriage; the rocker has its two parts controlled by means of two rods each connected to these hinges; a downstream portion of the downstream body is connected to the flap by means of a rod hinged respectively to the downstream body and the flap, the downstream body is telescoped into the middle body and they are interconnected through pins extending from sides of the middle body into rails in the sides of the downstream body; the flap is carried by the carriage in an upstream location and the carriage as being driven by control flap and cover body motion.

5 Claims, 6 Drawing Sheets

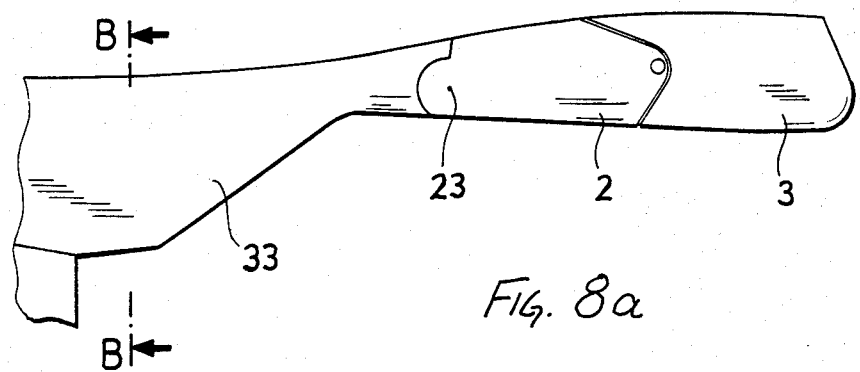
Fig. 8a
Fig. 8b
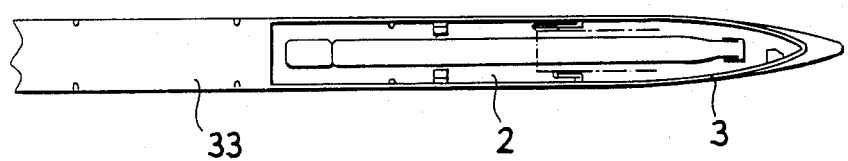
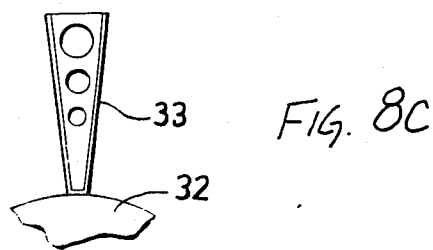
Fig. 8c

****

COVER FOR FLAP GUIDE RAILS IN AIRCRAFT WINGS

BACKGROUND OF THE INVENTION

The present application refers to an aerodynamic covering and lining for the guiding rails of landing flaps positioned in wings of aircraft, particularly aircraft having wings of the kind in which the chamber line can be varied. On using airfoils or wings with variable camber the profile and section of the wing is changed during flight. Such a feature can be used to match lift and drag properties of the wing to the different aerodynamic conditions as they vary during flight. The purpose of this is to improve the performance of the aircraft generally and to reduce the fuel consumption in particular. Wings having variable camber cannot be equipped with the usual aerodynamic covering for the landing flaps adjusting device since on changing the camber it is inherent that relatively large uncovered gaps obtain between the wing and such a cover. Gaps in turn cause the flow conditions around the wind to deteriorate.

DESCRIPTION OF THE INVENTION

It is an object of the present invention to provide a new and improved structure for wings with variable camber line permitting covering of any gaps in a consistent fashion regardless of the variation particulars so that the aforementioned drawbacks will not obtain.

It is a specific object of the present invention to provide a movable and displaceable aerodynamic lining and covering for the landing flap guiding rails on wings of aircraft particularly those with variable camber line as well as actuation and operational structure for these devices under utilization of landing flaps, landing flap carriages, guide rails, kinematic and adjusting devices under specific consideration of avoiding any gaps between the lining and the rails.

In accordance with the preferred embodiment of the present invention it is suggested to tri-part the aerodynamically sloped cover for the landing flap guiding rails such that two of these three cover bodies are movably arranged, and the first, upstream one is rigidly secured to the aircraft wing; a middle cover body is pivotally linked or hinged with the upstream cover body and the third downstream cover body has an upstream end portion hinged to the landing flap carriages and a downstream portion of the downstream body is connected, preferably hinged, to the flap. The connection of the downstream body to the carriage includes preferably hinges and preferably a biparted rocker. The rocker parts are held and controlled through rods; the downstream cover is preferably connected to the rear portion of the landing flap through a control rod having its ends acting on pivot points. The downstream cover body is telescoped in the middle cover body and these two cover bodies are connected through pins which move in guide rails which are respectively located in the side walls of the cover bodies. The landing flaps are carried on the front sides of the flap carriage which is moved in different tracks on the guide rails. The flaps are protracted and retracted by at least two flap carriages.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 8 illustrates in three parts (a,b,c) a flap rail cover integrated in an engine pylon.

Proceeding now to the detailed description of the drawings, FIG. 1 illustrates an aircraft wing 29 with multiple landing flaps 6 and an aerodynamically shaped cover 31 for the flap adjusting structures. If that cover were as shown in FIG. 2, of conventional design they would be unusable if the camber and curvature of the wing is to be changed. A typical exemplary chamber change is illustrated by way of example in FIG. 2. FIG. 2 moreover shows that in the case of chamber variation it is inherent that a conventional cover gaps arises producing unfavorable aerodynamic flow conditions.

The gap formation is avoided in accordance with the invention through a tri-parting of the cover for the landing flap guide rails. These aspects will be described next.

Figure 1:
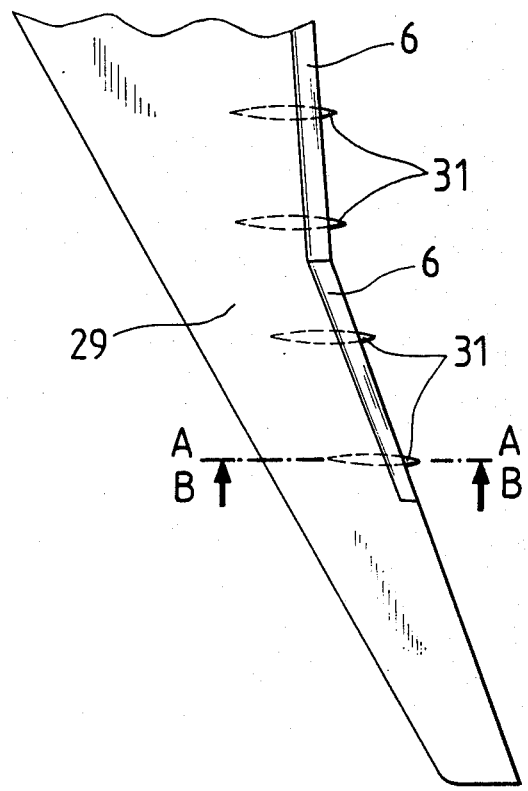
FIG. 1 is a top elevation of the wing of an aircraft illustrated primarily for purposes of overall orientation.
Figure 2:
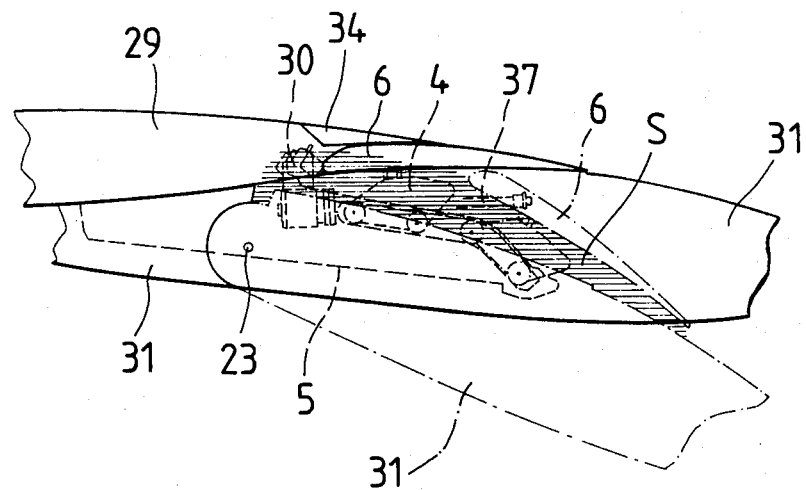
FIG. 2 is a (hypothetical) section view along lines AA of FIG. 1 if a conventional and not the inventive cover were used.
Figure 3:
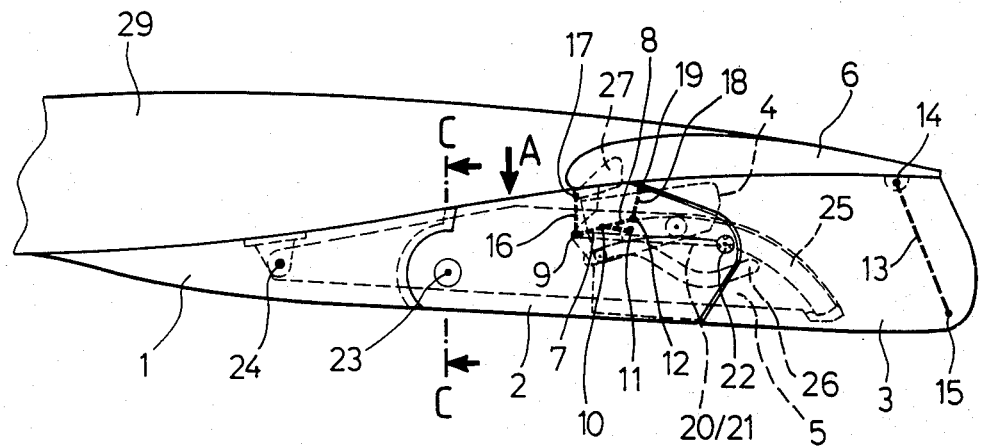
FIG. 3 is a (real) section along line BB of FIG. 1 applicable for the case of wing or inventive rail cover.

Turning specifically to FIG. 3, each landing flap 6 has a front or leading edge supported by landing flap carriage 4 which carriage 4 in turn runs and is supported in guide rails 5; there are at least two carriages and two rails per flap. These carriages 4 and, therefore, the respective landing flap 6, will be retracted and protracted by means of an adjustment and servo drive 30 acting and driving the carriages. The rails 5 are connected to the wing structure 29 in general and are covered aerodynamically through the inventive tri-parted cover in the following manner.

Figure 4:
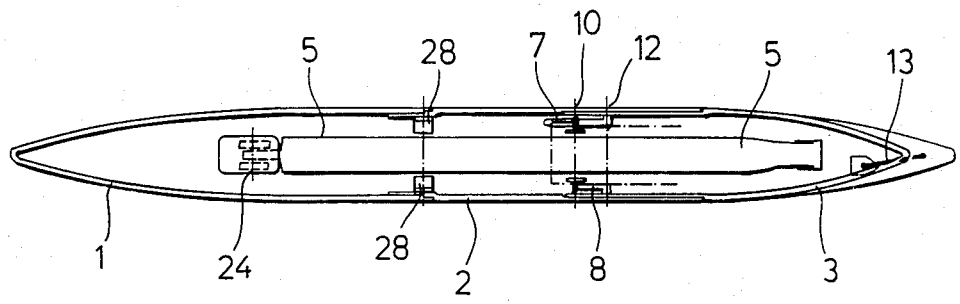
FIG. 4 is a view as indicated by arrow A in FIG. 3.
Figure 5:
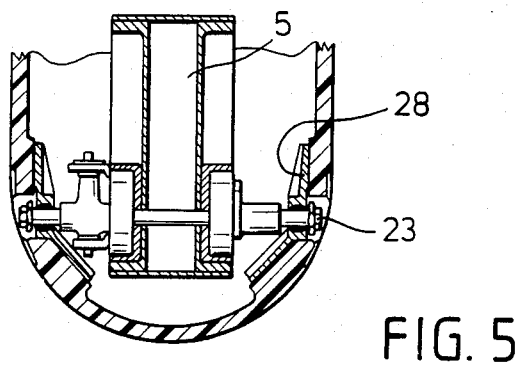
FIG. 5 is a section taken along line CC of FIG. 3.

The triparted cover has a frontal upstream cover body or element 1, a middle cover body or element 2 and a rear, trailing or downstream cover body or element 3. The frontal or upstream cover body 1 is secured to the wing 29 and thus does not move. Contrary thereto middle and downstream cover body 2 and 3 are movably disposed. Herein specifically rear or downstream cover body 3 is connected upstream through a first hinge 12 with a divided rocking device 7 and 8 which in turn is connected to the flap carriage 4 through a second hinge 10, as shown also in FIG. 4.

The rocking structure 7 has its two parts 7 and 8 respectively mounted and held through two control rods 16 and 18 which respectively act on pivot points 9,17 (for rod 16) and 11,19 (for rod 18). The mounting obtains such that as the cover body 3 is lowered during protracting the landing flap it is lowered more than the middle body 2 so that the rear or downstream body 3 is pulled out of the middle body 2 as soon as the flap 6 tilts over the middle body 2. In some cases during operation i.e. protraction and retraction of the last flap, the flap is in addition tilted about an axis that extends transversely to the spanwise direction of the wing 29.

The control rods 16,18 in cooperation with the rocking device 7 and 8 provide for an additional lowering of the bodies or elements 2 and 3 in this instance. The length of the control rod 16 and 18 for each cover body operation is selected such that the effective turning angle, as far as the respective landing flap 6 is concerned, controls the cover body or element 2 and 3 such that the formation of gap is avoided. Also, dipping of the flap 6 into the side walls of the body 2 and 3 have to be avoided.

In the rear portion of downstream cover body 3 a connection is provided being means of and through a control rod 13, with end points being pivot points 14 and 15 thus connecting downstream body 3 to the flap 6. This means that the motion of that part of the cover body is not only coupled, in the general sense, to the flap 6 but in parts receives therefrom a motional component. The middle cover body 2 is connected upstream to the front or upstream cover body 1 via a turning pivot or hinge point 23. The trailing or rear end of the middle cover body 2 reaches over the front end of the rear or downstream cover body 3 and to an extent sufficient so that even under full protraction and extension of the landing flap 6 no gap forms between the two bodies or elements 2 and 3.

A pivot hinge or turning point 24 is connected to the guide rail structure 5 (FIG. 4). 27 and 28 are connecting pieces respectively for rod 16 and turning point 23. Reference numeral 34 refers to a spoiler 35 and 36 and respectively upstream and downstream connecting points for and to flap 6. 37 is an adjoining spindle for adjusting the position of flap 6 vis-a-vis carriage 4.

The vertical motion of the middle cover body 2 is in fact controlled through the motion of the trailing or downstream cover body 3; body 3 is in turn driven by the carriage 4 during retraction and protraction or extension of the landing flap 6 through the carriage 4. Middle cover body 2 is run and guided in two rails 20 and 21 which are connected to body 3. Guide pins 22 are fastened in the side walls of the middle cover body or element 2 and they are movably mounted, guide and run in these rails 20 and 21. These pins 22 therefore and in cooperation with the landing flap carriage motion make sure that cover bodies or elements 2 and 3 always abut tightly during any and all possible and different landing flap positions and wing cambers such that no steps or gaps form.

Figure 6:
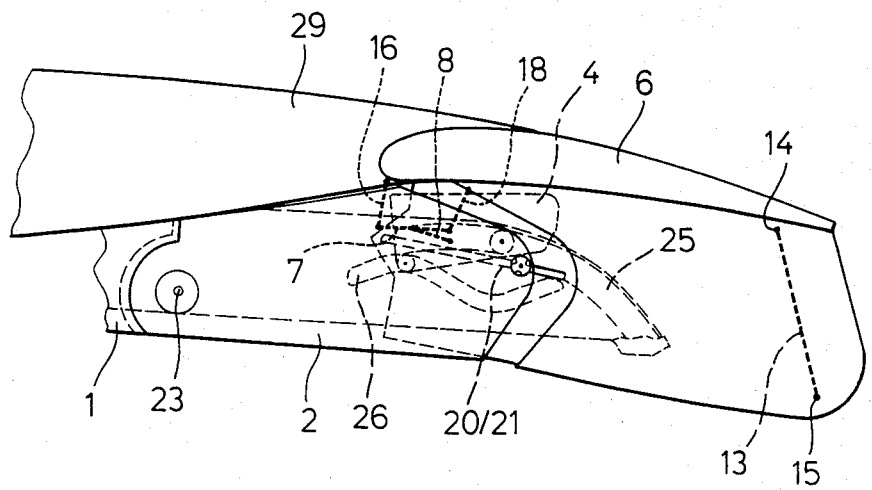
FIG. 6 is a view similar to FIGS. 2 and 3 and illustrates the position of the rail cover with maximal wing chamber.
Figure 7A:
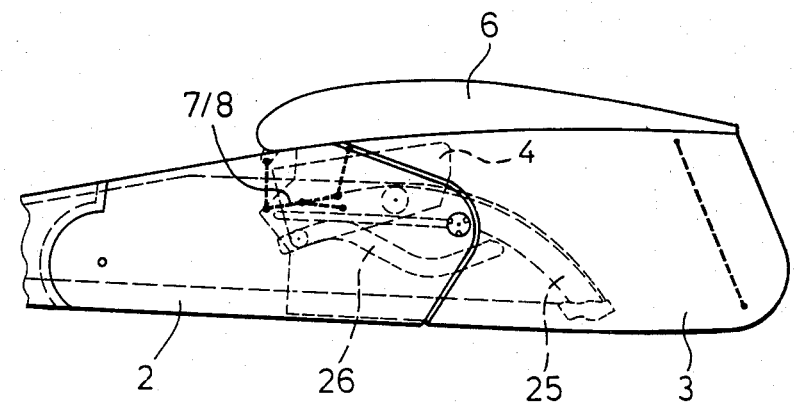
FIGS. 7a-7d illustrate landing flap and rail covers in various position of protraction.
Figure 7B:
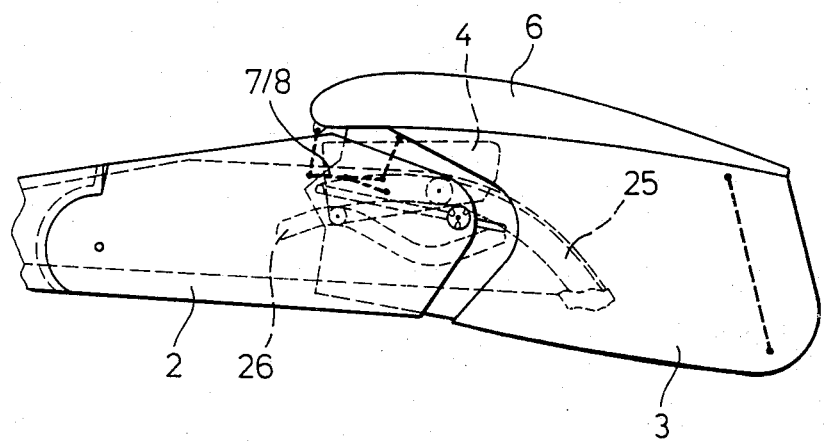
Figure 7C:
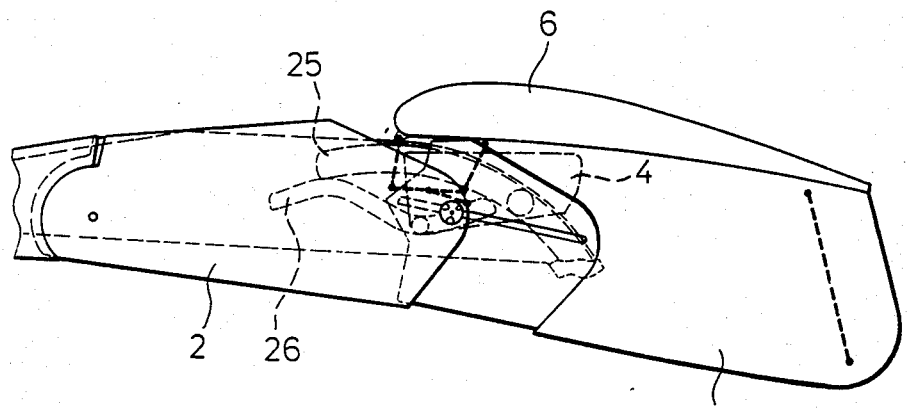
Figure 7D:
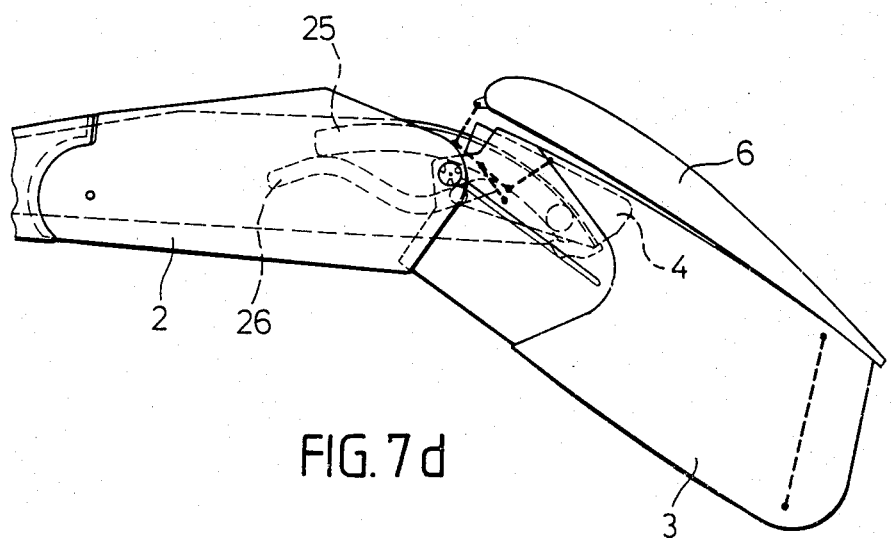

FIG. 6 shows the landing flaps 6 as well as the cover bodies or elements 2 and 3 in a position corresponding to a maximum wing camber. FIG. 7 shows four different positions of protraction wherein specifically FIG. 7a shows landing flaps 6 as well as cover bodies 2 and 3 in a completely retracted disposition. FIG. 7b shows a position of these parts corresponding to a maximum wing camber; FIG. 7c shows the landing flaps 6 and the cover bodies 2 and 3 in a position during take off and FIG. 7 shows these parts during landing.

These illustrations emphasize how the rearmost cover body 3 is shifted during protraction of the flap 6 under concurrent operation of camber control. This shifting occurs into the middle cover body 2 and constitutes the main instrumentality to avoid the formation of a gap between the several covers and wing 29.

FIG. 8 shows a different embodiment which is self explanatory generally and wherein the cover body 1 is integrated in an engine pylon.

The invention is not limited to the embodiments described above but all changes and modifications thereof, not constituting departures from the spirit and scope of the invention, are intended to be included. For example, guide rails 5 may be contoured such that the rocking device 7 and 8 can be of single piece construction. In accordance with another configuration one can make hinge points 10 and 12 to actually coincide and to establish a common hinge point; that means that the rocking device 7 and 8 on one hand and the control rod 16 and 18 on the other hand can be omitted. In another embodiment one may secure or rigidly connect the rearmost cover body 3 with the landing flap 6. Also, in this case one does not need the rocking device 7 and 8 nor the control rod 13,16 and 18.

I claim:

1. In an aircraft wing having a landing flap, guide rails and a flap carriage for holding the flap, the carriage being driven by a drive and being guided in the rails, a cover structure for the rails for avoiding any formation of gaps unfavorable for aerodynamic flow over and around the wing, the improvement comprising:
   a tri-parted, aerodynamically contoured cover body having an upstream cover body, a middle cover body and a downstream cover body;
   said upstream body being secured to said wing;
   said middle body being hinged to the upstream body;
   said downstream body being in an upstream portion, hinged to the carriage, and in a downstream portion the downstream body is connected to the flap;
   the downstream body being telescoped into the middle body and they are interconnected through pins extending from sides of the middle body to rails in sides of the downstream body; and
   the flap being carried by the carriage in an upstream location, the carriage as being driven by said drive thereby controlling motion of the flap as well as of the middle and downstream bodies.

2. The improvement as in claim 1, a connection of the downstream body to the carriage including a first hinge connected to the downstream body, a biparted rocker connected to the first hinge, a second hinge connecting the rocker to the carriage; the rocker having its two parts controlled by means of two rods each connected to hinges.

3. The improvement as in claim 2, the downstream body being connected to the flap by means of a rod, hinged respectively to the downstream body and the flap.

4. The improvement as in claim 2, the first and second hinges coinciding.

5. The improvement as in claim 1, the upstream body being a part of an engine pylon.

* * * * *